Nov. 16, 1965          P. F. DONLEY          3,218,086
DIMENSIONALLY STABILIZED SYNTHETIC RESIN SEALING RING
Filed March 19, 1962
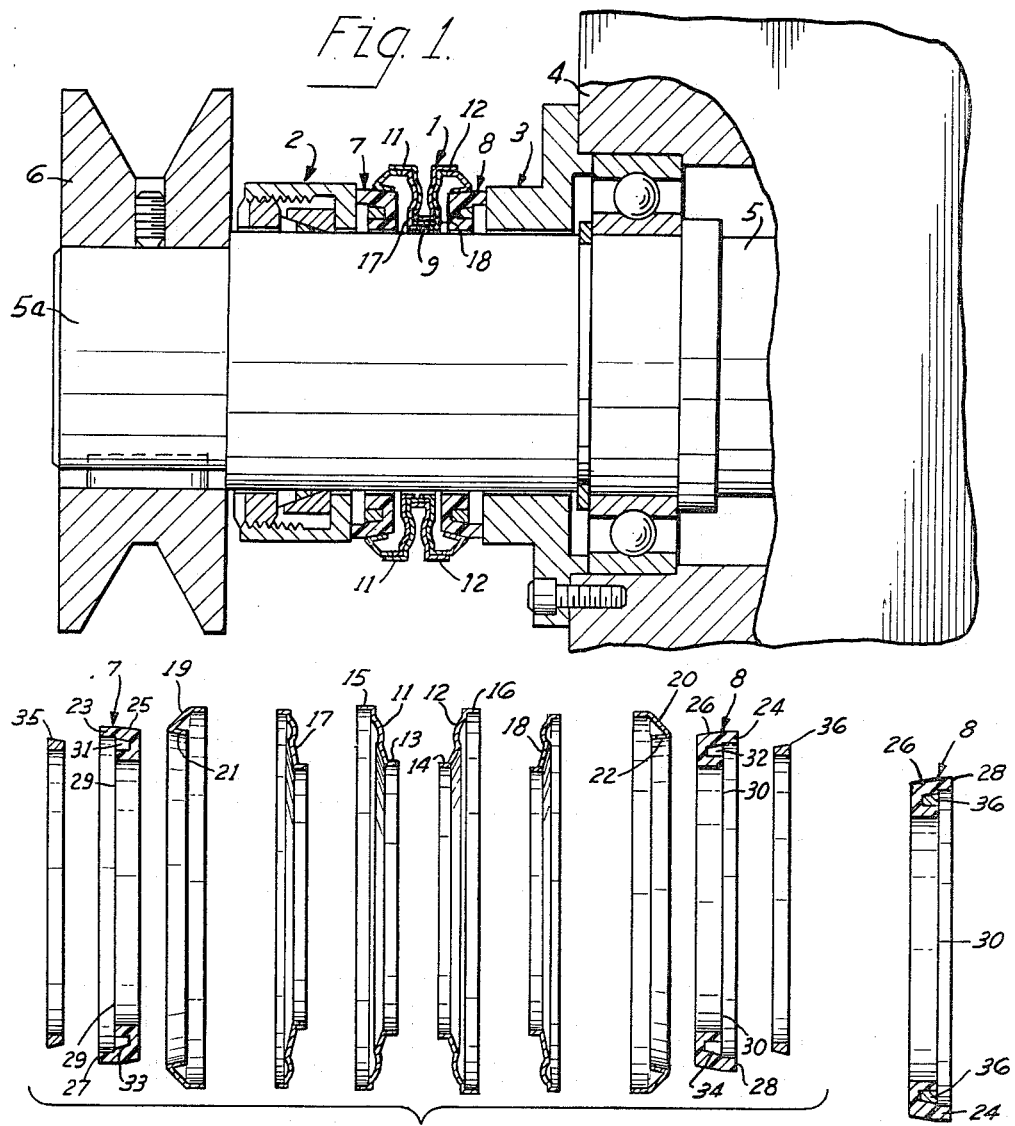
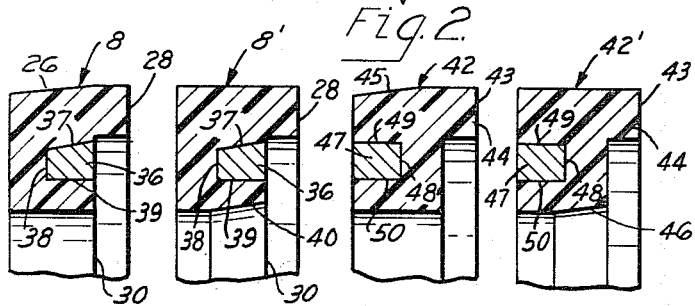
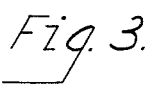
INVENTOR.
PHILIP F. DONLEY
BY Bosworth, Sessions,
Herndon & Knowles
ATTORNEYS.

United States Patent Office 3,218,086
Patented Nov. 16, 1965

3,218,086
DIMENSIONALLY STABILIZED SYNTHETIC
RESIN SEALING RING
Philip F. Donley, Shaker Heights, Ohio, assignor to
Donley Products, Inc., Cleveland, Ohio, a corporation
of Ohio
Filed Mar. 19, 1962, Ser. No. 180,612
5 Claims. (Cl. 277—96)

This invention relates to a synthetic resin sealing ring and to the sealing unit of which it forms part.

Sealing rings of synthetic resin have been employed heretofore, particularly sealing rings consisting largely or entirely of thermosetting resins; e.g., phenol-formaldehyde, urea-formaldehyde and the like. To a much lesser degree, use has also been made of sealing rings consisting wholly or in part of thermoplastic resins, particularly such as are characterized by sufficiently high heat distortion temperatures (200° F. or better) measured under test conditions using a standard load (66 p.s.i.). Examples of synthetic resins of the latter type are the filled and unfilled nylons (sintered and unsintered), polytetrafluoro ethylenes, polychlorotrifluoro ethylenes, polyvinylidene fluorides, polypropylenes, polycarbonates and acetal polymers and copolymers.

Whereas thermosetting resins tend as a rule to be dimensionally stable, a number of representative thermoplastic resins included among or of the nature of those enumerated above have a tendency to "creep" under load, thus greatly restricting their usefulness. When manufactured as below described, thermoplastic resin sealing rings conforming to the teachings of the present invention largely or entirely overcome the effect of any latent inability to hold to the desired dimensions while still preserving advantageous properties that are inherent in these and similar thermoplastic resins, especially such desirable properties as good moldability, good machineability and low coefficients of friction.

A principal object of the present invention is to modify the construction of a typical thermoplastic sealing ring in such a way as to stabilize it, particularly if it is one forming part of a sealing unit of one of the kinds described in United States Patents 2,776,851, 2,941,825 and 3,028,-163 to August H. Heinrich. Certain of the sealing units described in these patents have in common the fact that the sealing rings are provided with frusto-conical surfaces, hereinafter called the holding surfaces, by which they are held in place in cooperating supporting elements with complementary frusto-conical shapes. In relation to the central axis of the sealing ring, the angle of taper is in such cases characteristically less than 7½°, usually about 5°.

In such circumstances, complementary surfaces tend to adhere tenaciously to each other provided the materials in which they are formed are dimensionally stable. If, however, the sealing ring as a whole is of a thermoplastic resin that is not sufficiently stable dimensionally, the sealing ring may tend to become unseated as a result of the tendency of many such materials to "creep" under conditions of use. By modifying the construction of the sealing ring to incorporate a stay ring or similar stabilizing element, the present invention overcomes this disadvantage and makes possible much more widespread use of sealing rings of thermoplastic resins such as those previously mentioned which in other respects have characteristics making for effective sealing.

Other objects, advantages and features of the invention will be apparent from the description which follows and from the accompanying drawings, in which:

FIGURE 1 is a section with parts in elevation showing a projecting shaft end with the sealing unit of the present invention mounted on it.

FIGURE 2 is an exploded view of the sealing unit, the parts thereof being shown in section.

FIGURE 3 is a section showing one of the two sealing rings with a metal stay ring inserted in the body thereof.

FIGURE 4 is an enlargement of a portion of FIGURE 3.

FIGURE 5 is a similar enlargement showing a modification.

FIGURES 6 and 7 are views similar to FIGURES 4 and 5, respectively, showing modifications in which a stay ring of slightly different shape is inserted in the sealing ring from the opposite side thereof.

What is shown in FIGURE 1 is a representative installation in which a sealing unit 1 is interposed between a collet housing 2 and a bushing 3 attached to a machine frame 4. Projecting shaft 5 carries on its reduced outer end 5a a sheave 6. The available space between sheave 6 and frame 4 accommodates sealing unit 1, which includes a first sealing ring 7 bearing against collet housing 2 and a second sealing ring 8 bearing against bushing 3. The two sealing rings are carried by common supporting means 9 located between them. Along with other elements, two like annular metal springs 11 and 12 go to make up such supporting means.

Symmetrical sealing units of this general type are disclosed in United States Patent 2,776,851 to August H. Heinrich, granted January 8, 1957. Similar sealing units constructed principally of sheet metal are disclosed in U.S. Patents 2,941,825 of June 21, 1960, and 3,028,163 of April 3, 1962, both to August H. Heinrich. An improved form of sealing unit is disclosed in U.S. application Serial No. 70,707, filed November 21, 1960, by Philip F. Donley. In the sealing unit of the present application, the invention has to do largely with the sealing rings, as will appear.

Referring to FIGURE 2 of the accompanying drawings, it will be noted that springs 11 and 12 are provided with integral mounting flanges 13 and 14 and integral lip-like flanges 15 and 16. Mounting flanges 13 and 14 are designed to telescope as shown in FIGURE 1: a continuous weld (not shown) formed by resistance welding is employed to hold them together. Lip-like flanges 15 and 16 extend oppositely to mounting flanges 13 and 14: they are provided for the dual purpose of holding two secondary leaf springs 17 and 18 in place in the assembly and mounting the metal supporting elements 19 and 20 that carry the sealing rings. Secondary leaf springs 17 and 18, which line the inside faces of primary leaf springs 11 and 12, are clamped in place between lip-like flanges 15 and 16 and supporting elements 19 and 20.

Supporting elements 19 and 20, which are attached by continuous welds to flanges 15 and 16, respectively, are generally annular but of channel-shaped cross section. It will be noted that the peripheral flanges forming inside walls 21 and 22 of the channels are inclined to the central axis of the sealing unit. This inclination is exaggerated in FIGURES 1 and 2 in the interests of clarity. In practice, the angles between sidewalls 21 and 22 and the central axis of sealing unit 1 are about 4°, although they may be somewhat more or somewhat less. Thus the inside walls of supporting elements 19 and 20 are frusto-conical in shape.

Sealing rings 7 and 8, which are preferably of glass-filled polytetrafluoroethylene, are characterized, among other things, by axially directed flanges 23 and 24 and, immediately to the rear thereof, by frusto-conical holding surfaces 25 and 26 that form part of the outer peripheries of the sealing rings. Holding surfaces 25 and 26 are designed for cooperation with the frusto-conical side walls of supporting elements 19 and 20 and are therefore tapered in complementary fashion; i.e., they define angles of about 4° to the central axis of the sealing unit. By so relating these parts, sealing rings 7 and 8 are caused to adhere tenaciously to supporting elements 19 and 20.

The sealing faces of sealing rings 7 and 8, indicated at 27 and 28 in the accompanying drawings, are on the ends of flanges 23 and 24; i.e., where the flanges bear against collet housing 3 and bushing 4. Inwardly thereof, sealing rings 7 and 8 are recessed to provide shallow cylindrical hollows, the bottoms of which are defined by shoulder 29 in sealing ring 7 and shoulder 30 in sealing ring 8. Beyond shoulders 29 and 30, sealing rings 7 and 8 are further recessed as shown in FIGURE 2 to provide annular chambers 31 and 32, the latter serving as means for the reception of the stay rings hereinafter to be described. Preferably, the outer walls of chambers 31 and 32, designated 33 and 34, are flared slightly to facilitate entry of the stay rings, although chambers 31 and 32 may be annular in the literal sense. It will be noted that chambers 31 and 32 lie inwardly of frusto-cylindrical holding surfaces 25 and 26 on sealing rings 7 and 8.

Stay rings 35 and 36 are preferably of stainless steel but may be of any other metal or material having suitable physical characteristics. They are so shaped as to correspond to the shape of chambers 31 and 32 in sealing rings 7 and 8. Normally, however, they are oversize in the sense that their outer peripheral faces, whether or not tapered, measure a few thousandths of an inch more in diameter than walls 33 and 34 of chambers 31 and 32. This difference, which is too small to appear in the drawings, may be as little as one thousandth or as much as five-thousandths of an inch. Similarly, the inner peripheral faces of the stay rings measure slightly less in diameter, from one-thousandth to five-thousandths of an inch, than the corresponding walls of the chambers 31 and 32. Thus the stay rings, measured on both inner and outer peripheries, are oversize, as compared with the chambers into which they are to be inserted.

In the stay ring appearing in FIGURES 3 and 4, tapered face 37, flat bottom face 38 and cylindrical face 39 are machined to a smooth finish to permit them to bear snugly against the side and bottom walls of chamber 32 in sealing ring 8.

Stay rings 35 and 36 may be inserted in any suitable way in chambers 31 and 32 in sealing rings 7 and 8, if need be with the assistance of a tool adapted to urge them into place in the chambers. The flared shape of the outer peripheries of the stay rings and chambers facilities entry and seating of the stay rings; however, absence of the flared shape does not prevent proper seating, particularly if a tool is used to make sure that the stay rings are properly seated. Inasmuch as stay rings 35 and 36 are deliberately made oversize, the effect of introducing the stay rings into the chambers in the sealing rings is to exert radial forces toward the outside and inside peripheries of the sealing rings. These forces continue to exert themselves during the useful life of the sealing rings. They have a stabilizing effect on the polytetrafluoroethylene of which the sealing rings are made, largely or entirely eliminating "creep." FIGURE 3 shows a completely assembled sealing ring in central section, as does the fragmentary detail of FIGURE 4.

FIGURE 5 shows a sealing ring 8' similar to sealing ring 8 in which, however, the outer peripheral face of the sealing ring is cylindrical rather than tapered as in FIGURE 4. In sealing ring 8', the inner peripheral face 40 of the sealing ring is tapered as shown in order to provide a holding surface permitting the use of supporting means designed to support sealing ring 8' from its inner periphery, as in certain of the previously mentioned Heinrich patents. The stay ring of FIGURE 5, like that of FIGURE 4, is provided with a frusto-conical outer face 37, flat bottom face 38 and a cylindrical inner face 39.

Further modifications are shown in FIGURES 6 and 7, wherein sealing rings 42 and 42' correspond generally to sealing rings 8 and 8'. The sealing surface, here designated 43, is disposed as before on the exposed end of a peripheral flange, here designated 44. The holding surfaces, designated 45 and 46, are respectively on the outside and inside peripheries of sealing rings 42 and 42'. Stay rings 47 are square cornered, each having a flat bottom face 48 and cylindrical inner and outer peripheral faces 49 and 50. As compared with stay rings 36, they are inserted from and received in chambers on the opposite side of the sealing rings. Otherwise, stay rings 47 are similar to stay rings 36. Like the latter, stay rings 47 are oversize in relation to the chambers in which they are received.

In a typical case in which the projecting portion of shaft 5 has a diameter of 1⅛ inches, the maximum diameters of sealing rings 7 and 8; i.e., the outer diameters of peripheral flanges 23 and 24, will be 1.844 inches. The inner diameters will be very slightly greater than the diameter of the shaft, enough to permit the sealing rings to ride on the shaft with a clearance of 0.005 to 0.020 inch. Measured from front to rear, sealing rings 7 and 8 may in such case have an overall length of 0.325 inch. The shallow cylindrical recess defined by shoulder 29 or shoulder 30, as the case may be, may have an altitude of 0.115 inch and a diameter of 1.675 inches. Peripheral flanges 23 and 24 therefore will have an altitude of 0.115 inch and a thickness of 0.169 inch. Measured from front to rear, stay rings 35 and 36 should be of the same altitude as the chambers in which they are to be received; i.e., 0.115 inch. In the preferred embodiment of the invention; viz., in the case of sealing rings 7 and 8 of FIGURES 1 to 4, the inner and maximum outer peripheries of the stay rings may measure 1.473 and 1.670 inches, respectively.

What have been described up to this point are sealing rings of commercial glass-filled polytetrafluoroethylene, which is subject to "creep" but as regards flatness retention, coefficient of friction, machineability and moldability is nevertheless a highly desirable material for use in a sealing ring. In lieu of the filled and unfilled polytetrafluoroethylenes may be used filled and unfilled polychlorotrifluoroethylenes, polyvinylidene fluorides, polypropylenes, polycarbonates, acetal polymers, nylons and similar thermoplastic resins with suitably high heat distortion temperatures. As determined under a load of 66 lbs. p.s.i., a standard load for test purposes, this temperature should, if possible, be well above 200° F.; e.g., 250 to 300° F. In the absence of load, the material should be able to resist continuous temperatures of 250° or more, preferably 350 to 450° F. Filled resins usually meet these requirements better than the corresponding unfilled resins.

Insofar as concerns the fillers, so long as they are in the category of reinforcing fillers or reinforcements they may be fibrous or non-fibrous, crystalline or amorphous, metallic or non-metallic, organic or inorganic. Examples of suitable reinforcing fillers are glass in the form of chopped fibers, asbestos, sisal, filamentous nylon and the like, although rovings, mascerated fabrics and cloth may be used. Examples of non-fibrous fillers are finely divided carbon, molybdenum disulyhide, quartz, zirconium, copper and other metals. Used in amounts up to about 50% of the weight of the resin, as in conventional glass-filled polytetrafluoroethylene, these and analogous fillers assist and are assisted by the stay ring in minimizing creep under load, preventing cold shrinkage, and maintaining dimensional stability generally.

Although the invention has been described as applied to sealing rings designed for use in sealing units of the kinds shown, described and claimed in the previously mentioned Heinrich patents, the use of frusto-conical holding surfaces on the inner or outer peripheries of the sealing rings is not an indispensable feature of the invention. Thus the features of the invention may be used to good advantage with a sealing ring of thermoplastic resin having a shape that is strictly annular; i.e., with cylindrical inner and outer peripheries and flat front and rear faces.

In the latter case, other means than those described above will naturally be used for holding the sealing rings in place.

In these and similar cases, the stabilization resulting from the introduction of the stay ring into the sealing ring, particularly if the stay ring is oversize, tends to prevent inadvertent separation of the sealing ring from the supporting element. The difficulty stems largely out of dimensional instability of the synthetic resin. However, stabilization by the methods and means above described virtually eliminates the effect of the dimensional instability: this is an important practical advantage.

It is intended that the patent shall cover, by summarization in appended claims, all features of patentable novelty residing in the invention.

What is claimed is:

1. In a sealing system, a dimensionally stabilized sealing ring comprising a synthetic resin annulus characterized on one of the two sides thereof by a flat sealing surface disposed between the inner and outer peripheries of the sealing ring as a whole, said flat sealing surface lying in a plane extending at right angles to the central axis of the sealing ring; a holding surface on one of the two peripheries of the sealing ring, said holding surface being disposed between said flat sealing surface and the opposite side of the annulus; means in the body of the sealing ring itself between the two sides thereof forming an annular opening of generally cylindrical shape for the reception of a stabilizing element; and, securely lodged in said opening, a continuous rigid member of generally cylindrical shape the inner and outer peripheries of which are of smaller and larger diameter, respectively, than the corresponding surfaces of said opening.

2. A dimensionally stabilized synthetic resin sealing ring according to claim 1 wherein the opening in the body of the sealing ring fronts toward the surface to be sealed.

3. A dimensionally stabilized synthetic resin sealing ring according to claim 1 wherein the opening in the body of the sealing ring fronts toward the side of the sealing ring opposite the surface to be sealed.

4. A dimensionally stabilized synthetic resin sealing ring according to claim 1 wherein, in order to facilitate entry of the stabilizing element, the opening in the body of the sealing ring flares outwardly toward one of the two sides of the sealing ring.

5. A dimensionally stabilized synthetic resin sealing ring according to claim 4 wherein, in order to facilitate entry of the stabilizing element, the opening in the body of the sealing ring flares outwardly toward the surface to be sealed.

References Cited by the Examiner

UNITED STATES PATENTS

| | | | |
|---|---|---|---|
| 2,881,015 | 4/1959 | Wahl | 277—96 XR |
| 2,941,825 | 6/1960 | Heinrich | 277—96 XR |
| 3,058,718 | 10/1962 | Johnson | 277—235 XR |
| 3,100,648 | 8/1963 | Lee et al. | 277—95 |

LAVERNE D. GEIGER, *Primary Examiner.*

EDWARD V. BENHAM, *Examiner.*